Nov. 16, 1971  K. I. LUNDGREN  3,619,904

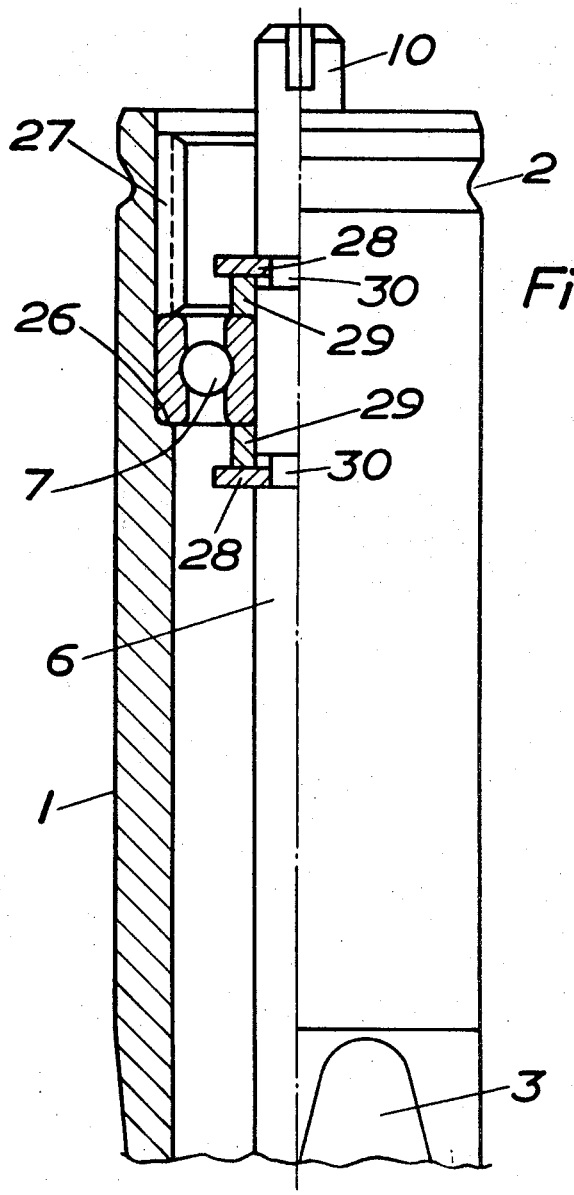
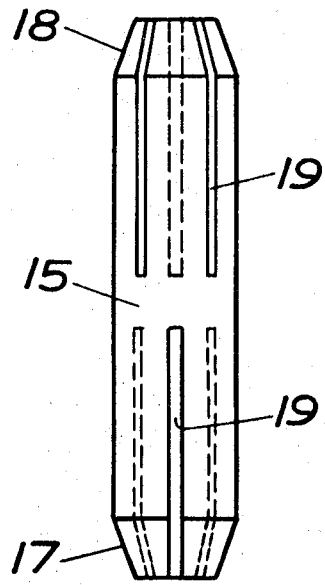

CHUCK CONTROL FOR DENTAL DRILLS AND THE LIKE

Filed Dec. 19, 1968  2 Sheets-Sheet 2

INVENTOR.
Karl Ivar Lundgren 3,619,904
CHUCK CONTROL FOR DENTAL DRILLS
AND THE LIKE
Karl Ivar Lundgren, Hagersten, Sweden, assignor to Atlas
Copco Aktiebolag, Nacka, Sweden
Filed Dec. 19, 1968, Ser. No. 785,178
Claims priority, application Sweden, Dec. 29, 1967,
17,978/67
Int. Cl. A61c 1/10
U.S. Cl. 32—26                                                   5 Claims

ABSTRACT OF THE DISCLOSURE

A chuck control mechanism for a dental drill or other tool having a tubular housing consisting of a ring member rotatably mounted at the outside of the housing and axially fixed in the housing and arranged upon rotation in one direction to tighten the grip of the chuck and upon rotation in the opposite direction to disengage the chuck from the shank of a working implement which may be any dental tool or other implement driven by a shaft mounted for rotation in the housing and engageable with the chuck.

---

The present invention relates to a chuck control mechanism which may be used in connection with tools having a tubular housing with a shaft rotatably mounted therein and a chuck adapted to be driven by said shaft. Such tools may be dental drills or other hand tools which are usually driven by a motor provided at the rear end of the tubular housing. In dental drills of this type the chuck is usually an axially slotted sleeve which is adapted to be driven by the shaft and arranged to grip or disengage a working implement shank upon an axial power bias on said chuck or relieving said power bias, respectively. The control mechanism for chucks of this type of tools has sometimes comprised a spindle or shaft extending through the tool and used in one way or the other to produce an axial power bias on the chuck necessary to make the chuck grip the implement shank and also for disengaging said shank by relieving the chuck of the power bias. This mechanism is complicated and difficult to manipulate and adds considerably to the weight of the tool. It has also been suggested to arrange small levers on the housing or a threaded sleeve at the implement end of the housing for manipulating a mechanism for bringing the chuck in and out of engagement with the implement shank. These mechanisms are also rather complicated. The present invention provides a mechanism which is simple in design and operation and which is therefore reliable and cheap in manufacture. The invention makes it possible to provide ball bearings in proper parts of the housing for mounting the drill shaft. The shaft is always braked when the chuck is disengaged and the manipulating mechanism is locked against rotation when the chuck is in gripping position. The control mechanism according to the invention comprises a ring member rotatably mounted at the outside of the housing and axially fixed in the housing and arranged upon rotation in one direction to tighten the grip of the chuck on an implement shank and upon rotation in the opposite direction to disengage the chuck from said implement shank, respectively.

Figure 1B:
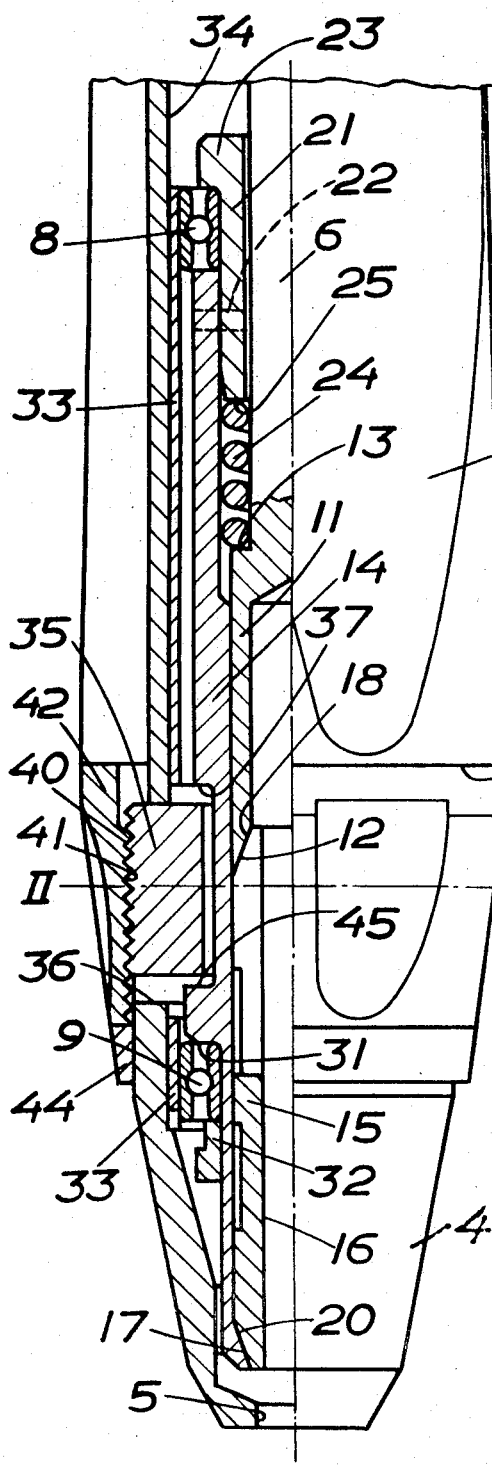
Figure 2:
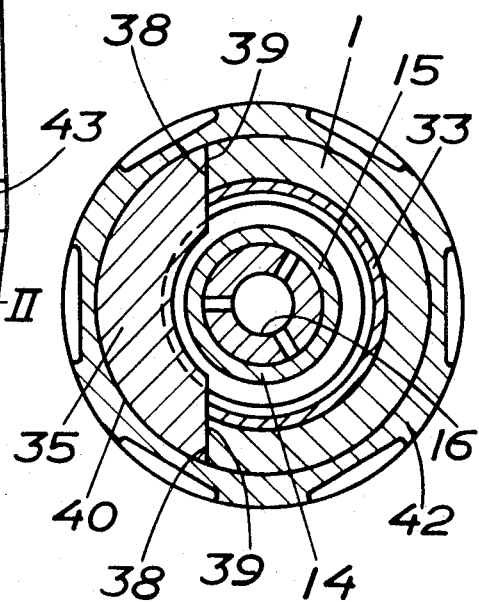

In the accompanying drawings one embodiment of a chuck control mechanism according to the invention is applied to a straight dental hand piece is illustrated by way of example. FIGS. 1a and 1b are side view and partial longitudinal section through a hand piece of a dental drill. FIG. 2 is a cross section on line II—II in FIG. 1b. FIG. 3 illustrates a chuck in side elevation.

The dental drill hand piece illustrated in the drawings is of the straight type and consists of a substantially cylindrical or tubular housing which adjacent the rear end has an annular groove 2 which is engaged by spring loaded balls or the like when the housing is pushed into a sleeve or socket of a driving unit for the working shaft of the hand piece. Said driving unit may, for instance, comprise a compressed air driven turbine motor or a transmission housing or a coupling housing which in a manner known per se transmits driving power from an electric motor to the working shaft of the hand piece. These units and parts are not illustrated here since they are not essential for the present invention.

The housing 1 has a number of external grip surfaces 3 which may be plane or slightly concave in order to provide a safe grip on the hand piece by the operator. At the implement end the tubular housing has a portion 4 with decreasing diameter and provided with an end opening 5 through which the usually circularly cylindrical shank of a working implement (not illustrated) such as a dental burr, a dental grinding wheel, a drill steel or the like may be inserted in the hand piece. A driven working shaft 6 is rotatably mounted in the tubular housing 1 partly directly in a ball bearing 7 and partly indirectly in ball bearings 8 and 9. The working shaft 6 is driven by the above mentioned turbine motor or another driving means over a coupling means including the rear end 10 of the working shaft. The front end of the working shaft forms a sleeve or socket 11 at the end of which an internal tapering surface 12 is provided. At the junction between the sleeve portion 11 and the straight portion of the working shaft 12 a shoulder 13 is formed. The sleeve portion 11 is inserted in a substantially tubular carrier member 14 for a chuck 15 which is illustrated in detail in side view in FIG. 3. The chuck 15 has a straight cylindrical central bore 16 in which the cylindrical shank (not illustrated) of a working implement may be inserted and fits. At the ends the chuck is provided with conically tapering portions 17 and 18 and, furthermore, with a number of slots 19 which extend axially from the ends of the chuck towards the central portion thereof.

The tapering end portions 17, 18 of the chuck cooperate with an internal conical surface 20 at the forward end of the carrier member 14 and the internal conical surface 12 in the sleeve portion 11 of the shaft 6. At the rear end of the carrier member 14 a bushing 21 is inserted in the carrier member and is kept therein by a press fit or by means of locking pins 22. The inner race of the bearing 8 is press-fitted between a flange 23 on the bushing 21 and the rear end of the carrier member 14. Between the bushing 21 and the shoulder 13 of the driven shaft 6 a stiff helical spring 24 is provided which spring acts to press the conical surface 12 in the direction towards the conical surface 20 so that the conical surfaces 18, 17 are subjected to an axial pressure which results in a clamping or gripping action on a shank of a working implement inserted in the bore 16 of the chuck 15. The working shaft 6 is axially fixed since the ball bearing 7 has its outer race locked between a shoulder 26 in the tubular housing 1 and a bushing 27 press-fitted in the housing. The inner race of the ball bearing 7 is fixed on the working shaft by locking rings 28 and spacer sleeves 29, said rings 28 engaging annular grooves 30 in the working shaft 6.

The carrier member 14 is mounted for rotation at its front end in the ball bearings 9, the inner race of which is therefore press-fitted between a shoulder 31 on the carrier member and a stop ring 32 press-fitted on the carrier member 14. The outer races of the ball bearings 8 and 9 are press fitted in a tube 33 which is inserted with a sliding fit in the tubular housing 1 in a bore 34.

The manipulation of the chuck 15 is achieved according to the invention by means of an axially movable slip member or jaw 35 which is formed as a ring segment disposed in a recess 36 in the tubular housing 1 and a recess 37 in the carrier member 14. The slip member or jaw 35 is formed as a ring segment, which is axially guided by a flat guide surface 38 in the tubular housing 1 against which the ring segment slides with a guide surface 39. The guide surface 39 is disposed in an axial plane through a chord of the ring segment. The peripheral surface of the ring segment 35 is provided with screw threads at 40 and the screw threads 40 cooperate and mesh with corresponding screw threads 41 at the inside of a control ring 42 which forms a manipulating ring for the ring segment 35. Naturally within the scope of the present invention more than one ring segment 35 may be provided and the guide surface 38 may naturally also be an angle surface or have other shape. The control ring 42 is locked against axial displacement between a shoulder 43 on the tubular member 1 and a shoulder formed by a ring 44 which is press fitted on the tubular member 1.

Operation to release the chuck 15 according to the invention is carried out by turning of the control ring 42 in one direction until the ring segment 35 has engaged a shoulder 45 on the carrier member 14. If the working shaft 6 rotates said rotation is then at first braked. Continued turning of the control ring 42 in the same direction relieves the chuck 15 of the axial pressure from the spring 24 so that the axial compression of the chuck ceases or is reduced so much that the shank of the working implement may be pulled out of the bore 16 in the chuck. The lead or pitch of the threads 40, 41 may preferably be selected so that the threads are self-locking. Suitable cam means may replace the screw threads 40, 41. When it is desired to fix a working implement shank in the chuck the above operations are carried out in the opposite way to the above described, i.e. by means of suitable opposite turning of the control ring the spring pressure on the chuck is relieved, the shank of a working implement is inserted in the bore 16 in the chuck, and the chuck is then again loaded by the pressure of the spring 24 by continued turning of the control ring 42 in said opposite direction until the ring segment 35 moves away from the shoulder 45. By turning the control ring until the segment 35 is pressed against the housing 1 the control ring is pressed against the ring 44 and kept in position by frictional grip on said ring.

The control mechanism above described and illustrated in the drawings should only be considered as an example and the details of the invention may be modified in several different ways within the scope of the claims.

What I claim is:

1. A chuck control mechanism for a tool having a tubular housing with a shaft rotatably mounted therein, an axially slotted chuck adapted to be driven by said shaft and arranged to grip or disengage a working implement shank upon an axial power bias on said chuck or to relieve the chuck of said power bias, respectively, said control mechanism comprising:
   (a) a tubular member axially movable and rotatably mounted in said housing and enclosing a portion of said shaft,
   (b) a spring interposed between said tubular member and said shaft and biasing the tubular member axially relative to the shaft,
   (c) cooperating conical surfaces located on the chuck and on the tubular member being pressed into engagement by the spring causing the chuck to grip said working implement shank,
   (d) a ring segment member of limited peripheral extension being axially movable in the housing and engaging the tubular member for axial displacement thereof, and
   (e) a control ring rotatably mounted and axially fixed in the housing,
   (f) said control ring threadably engaging said ring segment member to displace the tubular member axially in one direction to apply the spring load on the chuck for tightening the grip on the working implement shank and in the opposite direction to relieve the spring load from the chuck to disengage the implement shank, respectively.

2. A chuck control mechanism for a tool comprising:
   (a) a tubular housing,
   (b) a chuck or collet disposed in the housing at one end thereof and arranged for gripping a shank of a working implement,
   (c) a motor-driven shaft rotatably mounted in the housing,
   (d) means for disengageably coupling the shaft to the chuck,
   (e) a ring segment member engageable with said coupling means for effecting axial displacement of the coupling means, and
   (f) a control ring rotatably mounted on the outside of the housing a spaced distance from the implement end thereof,
   (g) said control ring being axially fixed in the housing and arranged upon rotation in one direction to move said ring segment member in position to tighten the grip of a chuck on the shank of the working implement and upon rotation in the opposite direction to move the ring segment member in a position to disengage the chuck from said shank.

3. A chuck control mechanism as defined in claim 2 wherein
   the chuck consists of a sleeve axially slotted from at least one end thereof,
   said sleeve having a cylindrical bore arranged to fit a cylindrical shaft of a working implement such as a dental drill or similar working tool and an externally tapering end portion located at least at the implement end of the mechanism,
   a carrier member located in the housing and enclosing the shank and chuck sleeve,
   said carrier member including a corresponding internal tapering surface to engage said sleeve tapering end portion,
   means adapted for pressing said tapering portion against said tapering surface to tighten the chuck sleeve on said cylindrical shank to grip the shank and for relieving the chuck sleeve of said pressure to disengage the shank,
   an axially displaceable ring segment member of limited peripheral extension in the housing and being axially movable by operation of the control ring by the rotation of said ring, and
   a spring interposed between the carrier member and the shaft and arranged to press the chuck towards the shaft in driving engagement therewith,
   said control ring and ring segment member serving to relieve the chuck of said spring pressure by turning the control ring in one direction.

4. A chuck control mechanism as defined in claim 2 wherein
   the ring segment member has a guide surface formed along an axial plane through the cord of the segment, and said tubular housing includes a cooperating guide surface formed in a recess located in the side of said housing.

5. A chuck control mechanism as defined in claim 2 wherein the control ring has internal threads and is rotatably fitted between two shoulders on the housing, said control ring member engages one of said shoulders with a frictional grip upon displacement of the chuck into a gripping position.

References Cited

UNITED STATES PATENTS

| | | | |
|---|---|---|---|
| 3,171,664 | 3/1965 | Benjamin et al. | 279—50 |
| 3,400,459 | 9/1968 | Stemler | 32—26 |

ROBERT PESHOCK, Primary Examiner

U.S. Cl. X.R.

279—53